(12) United States Patent
Saito et al.

(10) Patent No.: US 11,799,421 B2
(45) Date of Patent: Oct. 24, 2023

(54) INSPECTION SYSTEM FOR CONCENTRATING PHOTOVOLTAIC APPARATUS AND INSPECTION METHOD FOR LIGHT RECEIVING PART

(71) Applicant: SUMITOMO ELECTRIC INDUSTRIES, LTD., Osaka (JP)

(72) Inventors: Kenji Saito, Osaka (JP); Takashi Iwasaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 712 days.

(21) Appl. No.: 16/976,536

(22) PCT Filed: Feb. 19, 2019

(86) PCT No.: PCT/JP2019/006009
§ 371 (c)(1),
(2) Date: Aug. 28, 2020

(87) PCT Pub. No.: WO2019/176467
PCT Pub. Date: Sep. 19, 2019

(65) Prior Publication Data
US 2021/0050817 A1     Feb. 18, 2021

(30) Foreign Application Priority Data
Mar. 16, 2018   (JP) ................. 2018-049170

(51) Int. Cl.
*H02S 50/15*    (2014.01)
*H02S 20/32*    (2014.01)
(Continued)

(52) U.S. Cl.
CPC ............ *H02S 50/15* (2014.12); *B64C 39/024* (2013.01); *G01M 11/0207* (2013.01);
(Continued)

(58) Field of Classification Search
CPC .. G01M 11/0207; G01S 3/7861; H02S 20/32; H02S 40/32; H02S 50/15; B64C 39/024
See application file for complete search history.

(56) References Cited

U.S. PATENT DOCUMENTS

| | | | |
|---|---|---|---|
| 2012/0313661 A1 | 12/2012 | Jungwirth et al. | |
| 2015/0229269 A1 | 8/2015 | Rand et al. | |
| 2021/0126582 A1* | 4/2021 | Shue ................ | B64C 39/024 |

FOREIGN PATENT DOCUMENTS

| | | |
|---|---|---|
| JP | 2001-196609 A | 7/2001 |
| JP | 2014-226025 A | 12/2014 |

(Continued)

OTHER PUBLICATIONS

Gisele A. dos Reis Benatto et al. "Development of Outdoor Luminescence Imaging for Drone-Based PV Array Inspection". Proceedings of 2017 IEEE 44th Photovoltaic Specialists Conference (PVSC), 2017, pp. 2682-2687.

*Primary Examiner* — Thanh Luu
(74) *Attorney, Agent, or Firm* — Oliff PLC

(57) ABSTRACT

This inspection system for a concentrator photovoltaic apparatus includes: a module; a tracking mount configured to track the sun, the tracking mount having mounted thereto an array formed by assembling a plurality of the modules; an inverter apparatus to extract a direct-current power generated by the array, convert the direct-current power into an alternating-current power, and output the alternating-current power; and an imaging apparatus being positioned between the sun and the array tracking the sun, the imaging apparatus taking an image of the array from a direction orthogonal to a surface of the array. While the array is tracking the sun and is causing sunlight to be concentrated on the cell, the inverter apparatus produces a state where extraction of a power from the array is restricted, to cause the cell to (Continued)

spontaneously emit light, and the imaging apparatus takes an image of the emitted light of the cell.

11 Claims, 12 Drawing Sheets

(51) Int. Cl.
*H02S 40/32* (2014.01)
*B64C 39/02* (2023.01)
*G01M 11/02* (2006.01)
*G01S 3/786* (2006.01)
*G01N 21/95* (2006.01)
*B64U 101/00* (2023.01)

(52) U.S. Cl.
CPC ............ *G01S 3/7861* (2013.01); *H02S 20/32* (2014.12); *H02S 40/32* (2014.12); *B64U 2101/00* (2023.01); *G01N 21/95* (2013.01)

(56) References Cited

FOREIGN PATENT DOCUMENTS

| | | |
|---|---|---|
| JP | 2016-005426 A | 1/2016 |
| JP | 2016-019408 A | 2/2016 |
| JP | 2016-063704 A | 4/2016 |
| JP | 2016-208677 A | 12/2016 |
| WO | 2012/147758 A1 | 11/2012 |

* cited by examiner

INSPECTION SYSTEM FOR CONCENTRATING PHOTOVOLTAIC APPARATUS AND INSPECTION METHOD FOR LIGHT RECEIVING PART

TECHNICAL FIELD

The present invention relates to an inspection system for a concentrator photovoltaic apparatus, and an inspection method for a light receiving portion.

This application claims priority on Japanese Patent Application No. 2018-049170 filed on Mar. 16, 2018, the entire content of which is incorporated herein by reference.

BACKGROUND ART

A concentrator photovoltaic apparatus has, as a basic configuration, an optical system in which sunlight is concentrated by a condenser lens to be incident on a light receiving portion including a small cell for power generation. The basic configurations are arranged into a matrix shape in a housing, to form a module, and further, a large number of the modules are arranged to form an array (panel), whereby one concentrator photovoltaic apparatus is obtained. In order to track the sun, a tracking mount on which an array is mounted is supported by a post such that biaxial drive in the azimuth and the elevation is allowed (see PATENT LITERATURE 1, for example).

CITATION LIST

Patent Literature

PATENT LITERATURE 1: Japanese Laid-Open Patent Publication No. 2014-226025
PATENT LITERATURE 2: Japanese Laid-Open Patent Publication No. 2016-208677

SUMMARY OF INVENTION

The present disclosure includes the following invention. However, the present invention is defined by the claims.

An inspection system for a concentrator photovoltaic apparatus according to an aspect of the present invention includes: a module formed by assembling, in a housing, units in each of which a light receiving portion including a cell for power generation is provided at a position where sunlight is concentrated by a concentrating portion; a tracking mount configured to track the sun, the tracking mount having mounted thereto an array formed by assembling a plurality of the modules; an inverter apparatus configured to extract a direct-current power generated by the array, convert the direct-current power into an alternating-current power, and output the alternating-current power; and an imaging apparatus being positioned between the sun and the array tracking the sun, the imaging apparatus being configured to take an image of the array from a direction orthogonal to a surface of the array. While the array is tracking the sun and is causing sunlight to be concentrated on the cell, the inverter apparatus produces a restricted state where extraction of a power from the array is restricted, to cause the cell to spontaneously emit light, and the imaging apparatus takes an image of the emitted light of the cell.

An inspection method for a light receiving portion according to an aspect of the present invention is performed on: a unit in which a light receiving portion including a cell for power generation is provided at a position where sunlight is concentrated by a concentrating portion; a module being an assembly of the units; and an array being an assembly of the modules. The inspection method includes: causing the array to track the sun and causing sunlight to be concentrated on the cell; producing a state where an imaging apparatus is positioned between the sun and the array tracking the sun such that the imaging apparatus is able to take an image of the array from a direction orthogonal to a surface of the array; and producing a state where extraction of a power from the array is restricted, to cause the cell to spontaneously emit light, and taking, by the imaging apparatus, an image of the emitted light.

DESCRIPTION OF EMBODIMENTS

Figure 1:
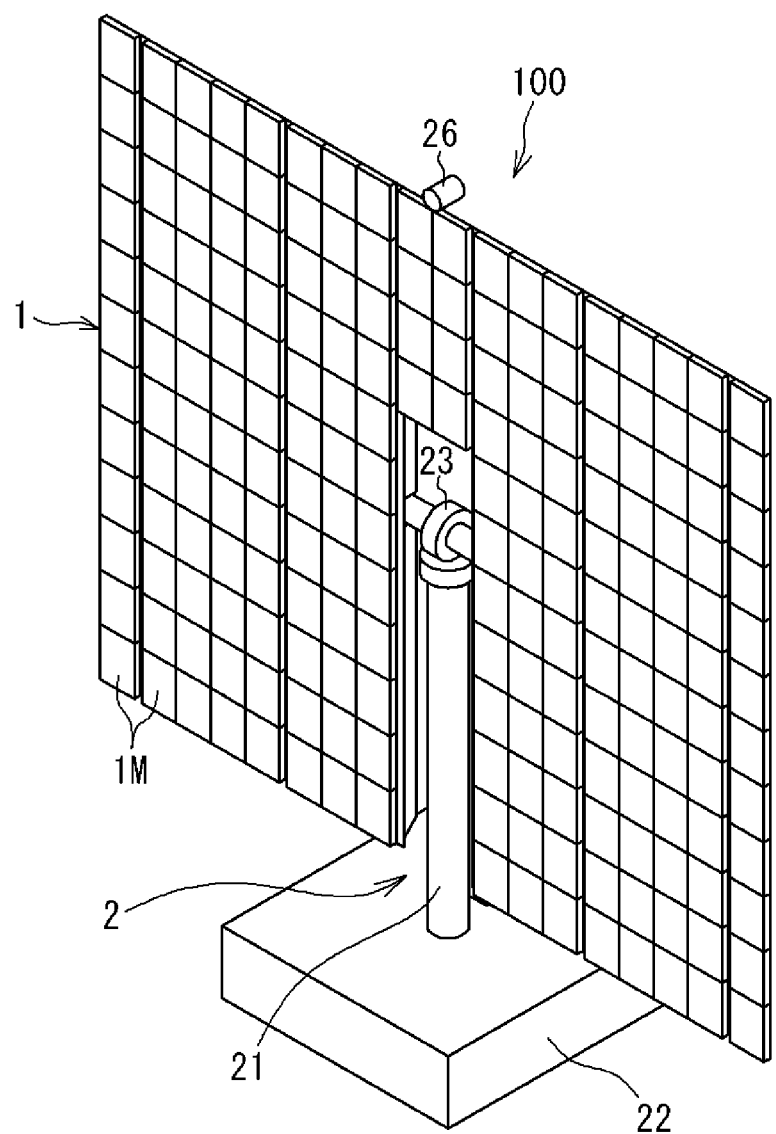
FIG. 1 is a perspective view of an example of one concentrator photovoltaic apparatus, viewed from the light receiving surface side, and shows the concentrator photovoltaic apparatus in a completed state.

Problems to be Solved by the Present Disclosure

In a concentrator photovoltaic apparatus, concentrated sunlight becomes very strong light. Thus, due to a long-time use, for example, a transparent silicone resin used around a cell of a light receiving portion could deteriorate and discolor to have a dark color or a whitish color having a low transparency. When the transparency is reduced, the concentrated sunlight is less likely to reach the cell. When the number of such light receiving portions is small, there is no big problem, but when the number of such light receiving portions in a module is increased, the amount of generated power is reduced. This requires replacement of the module as a unit. In addition, when the degree of a defect of a junction (PN junction) in a cell is increased, the amount of generated power is reduced.

However, in order to inspect whether discoloration has occurred, in a state where the light receiving surface of an array is directed downward, an operator on a gondola of a vehicle for high lift work, etc., checks by viewing from the rear side of the array, for example. Such checking work takes time (man-hours), and is not efficient. There also is a concentrator photovoltaic apparatus of a type in which the light receiving surface cannot be directed directly downward, in the first place. In this case, it is necessary to perform checking by viewing the array from a still higher place. Such checking work is not easy.

In addition, a defect of the junction in a cell cannot be detected through visual observation.

Meanwhile, as for a photovoltaic panel that is not a concentrating type, a technology in which a pulsed current is supplied from outside in a forward direction to a module to inspect whether the module is in a good state or a bad state, has also been proposed (for example, see PATENT LITERATURE 2). However, a compound semiconductor is used in a cell of a concentrator photovoltaic apparatus, and thus, when a reverse bias is applied, the junction could be easily broken. Therefore, in the module as a whole, a backflow prevention diode needs to be connected for protection. Even if a voltage is applied from an external power supply to the module having such a backflow prevention diode, it is not possible to cause a current to flow in the cell.

In view of the conventional problem, an object of the present disclosure is to facilitate inspection of a light receiving portion in a concentrator photovoltaic apparatus.

Effects of the Present Disclosure

According to the present disclosure, inspection of whether or not there is any change in a light receiving portion in a concentrator photovoltaic apparatus can be facilitated.

Summary of Embodiments

Summary of embodiments of the present disclosure includes at least the following.

(1) This inspection system for a concentrator photovoltaic apparatus includes: a module formed by assembling, in a housing, units in each of which a light receiving portion including a cell for power generation is provided at a position where sunlight is concentrated by a concentrating portion; a tracking mount configured to track the sun, the tracking mount having mounted thereto an array formed by assembling a plurality of the modules; an inverter apparatus configured to extract a direct-current power generated by the array, convert the direct-current power into an alternating-current power, and output the alternating-current power; and an imaging apparatus being positioned between the sun and the array tracking the sun, the imaging apparatus being configured to take an image of the array from a direction orthogonal to a surface of the array. While the array is tracking the sun and is causing sunlight to be concentrated on the cell, the inverter apparatus produces a restricted state where extraction of a power from the array is restricted, to cause the cell to spontaneously emit light, and the imaging apparatus takes an image of the emitted light of the cell.

This inspection system for the concentrator photovoltaic apparatus is an inspection system realized by focusing on the fact that the cell can be caused to spontaneously emit light, and the fact that the emitted light can be observed from outside through the concentrating portion. When the cell is caused to spontaneously emit light, if there is any change in the light receiving portion, an optical result based on the emitted light of the cell is influenced. For example, at a place where the resin around the cell is not deteriorated, the spectral intensity of the emitted light observed through the concentrating portion is relatively high. In contrast to this, at a place where the resin around the cell is more deteriorated, the spectral intensity of the emitted light is reduced accordingly. Therefore, deterioration of the resin can be detected on the basis of the spectral intensity.

Thus, inspection of whether or not there is any change in the light receiving portion can be facilitated.

(2) In the inspection system for the concentrator photovoltaic apparatus according to (1), the restricted state may be a state where no power is extracted from the array during power generation.

In this case, due to recombination of electrons and hole carriers in the cell, the cell causes a light emission phenomenon. Thus, the imaging apparatus can take an image of this.

(3) In the inspection system for the concentrator photovoltaic apparatus according to (1), the restricted state may be a state where a maximum power point tracking control for the array is not optimized.

In this case, due to recombination of electrons and hole carriers in the cell, the cell causes a light emission phenomenon. Thus, the imaging apparatus can take an image of this. For example, in a time period where solar radiation is relatively weak, as in the morning, the evening, etc., the maximum power point tracking control is not optimized sometimes, and the power is internally consumed by the cell. This causes a light emission phenomenon.

Evaluation of a good state or a bad state of the light receiving portion on the basis of the light emission phenomenon needs to be based on quantitative determination, and not based on "somewhat bright/dark". In the case of (2) above, for example, on the basis of the amount of direct solar radiation and the optical efficiency of the concentrating portion, it is possible to calculate an estimation value of the spectral intensity of the emitted light in (4) described later that should be internally consumed at the luminous efficiency of the cell. Therefore, whether the light receiving portion is in a good state or a bad state can be quantitatively determined on the basis of comparison with the estimation value. In the case of (3) above, when a power is extracted although the maximum power point tracking control is not optimized, a voltage is outputted and a current flows. Thus, for example, on the basis of the amount of direct solar radiation, the voltage and the current of the module or the array, and the optical efficiency of the concentrating portion, it is possible to calculate an estimation value of the spectral intensity of the emitted light that should be internally consumed at the luminous efficiency of the cell. Therefore, whether the light receiving portion is in a good state or a bad state can be quantitatively determined on the basis of comparison with the estimation value.

(4) In the inspection system for the concentrator photovoltaic apparatus according to any one of (1) to (3), taking an image of the emitted light of the cell is extracting a spectrum of the emitted light, for example.

In this case, in the case of the emitted lighted from, for example, the top cell of the cell, a spectrum of visible light is extracted, and if there is any change, the change can be detected. In the case of the middle cell or the bottom cell, a spectrum of near-infrared emission light or infrared emission light is released. Therefore, on the basis of these, if there is any change, an internal defect can be detected in a non-destructive manner. In addition, for example, on the basis of how much the peak in the spectrum of the initial emitted light has shifted, the temperature at the junction in the cell can be analyzed, and deterioration of heat dissipating performance can also be analyzed.

(5) In the inspection system for the concentrator photovoltaic apparatus according to any one of (1) to (4), the imaging apparatus may be mounted to an aerial vehicle.

In this case, the imaging from a high place can be easily performed by the aerial vehicle (for example, a so-called drone), with the sun on the rear side.

(6) In the inspection system according to (5), a pyrheliometer configured to detect an amount of direct solar radiation that reaches the array may be provided to at least one of the array and the aerial vehicle.

In this case, while the amount of direct solar radiation is measured by the pyrheliometer, if the spectral intensity of the emitted light from the cell is measured, and further, for example, if the current and the voltage of the module or the array are detected, the emitted light at the light receiving portion can be quantitatively evaluated.

(7) In the inspection system according to (5), an optical filter that allows only a spectrum of the emitted light from the cell to pass through the optical filter may be mounted to the imaging apparatus.

In this case, only the emitted light of the cell can be extracted from strong reflected light and scattered light of sunlight.

(8) Meanwhile, this is an inspection method for a light receiving portion performed on: a unit in which a light receiving portion including a cell for power generation is provided at a position where sunlight is concentrated by a concentrating portion; a module being an assembly of the units; and an array being an assembly of the modules. The inspection method includes: causing the array to track the sun and causing sunlight to be concentrated on the cell; producing a state where an imaging apparatus is positioned between the sun and the array tracking the sun such that the imaging apparatus is able to take an image of the array from a direction orthogonal to a surface of the array; and producing a state where extraction of a power from the array is restricted, to cause the cell to spontaneously emit light, and taking, by the imaging apparatus, an image of the emitted light.

This inspection method for the light receiving portion is realized by focusing on the fact that the cell can be caused to spontaneously emit light, and the fact that the emitted light can be observed from outside through the concentrating portion. When the cell is caused to spontaneously emit light, if there is any change in the light receiving portion, an optical result based on the emitted light of the cell is influenced. For example, at a place where the resin around the cell is not deteriorated, the spectral intensity of the emitted light observed through the concentrating portion is relatively high. In contrast to this, at a place where the resin around the cell is more deteriorated, the spectral intensity of the emitted light is reduced accordingly. Therefore, deterioration of the resin can be detected on the basis of the spectral intensity.

Thus, inspection of whether or not there is any change in the light receiving portion can be facilitated.

(9) In the inspection method for the light receiving portion according to (8), inspection of the light receiving portion may be performed on the basis of a spectral intensity of the emitted light of the cell relative to an amount of direct solar radiation that reaches the array.

In this case, when the spectral intensity of the emitted light from the cell is measured while the amount of direct solar radiation is measured, the emitted light at the light receiving portion can be quantitatively evaluated.

(10) In the inspection method for the light receiving portion according to (8), inspection of the light receiving portion may be performed on the basis of a spectral intensity of the emitted light of the cell relative to a current and a voltage detected with respect to the module or the array.

In this case, when the spectral intensity of the emitted light from the cell is measured, and further, the current and the voltage of the module or the array are detected, the emitted light at the light receiving portion can be quantitatively evaluated.

(11) In the inspection method for the light receiving portion according to (8), inspection of the light receiving portion may be performed on the basis of a peak wavelength of a light emission spectrum of the cell, while at least one of an ambient temperature of the array and a temperature of a bottom face of a housing of the module is taken into consideration.

For example, in such a case where the flexible printed circuit of the light receiving portion is detached from the bottom face of the housing, heat dissipating performance of the cell decreases, resulting in a high peak wavelength. Therefore, whether or not there is an abnormality related to heat dissipation of the cell can be recognized on the basis of the peak wavelength. The temperature of the cell is also influenced by the ambient temperature (air temperature) of the array and the temperature of the bottom face of the housing. Therefore, in order to accurately and clearly determine whether the light receiving portion is in a normal state or an abnormal state, these pieces of information also need to be taken into consideration.

Details of Embodiments

Hereinafter, an inspection method based on light emission at a light receiving portion according to an embodiment of the present disclosure is described with reference to the drawings. <<Concentrator Photovoltaic Apparatus>>

Figure 2:
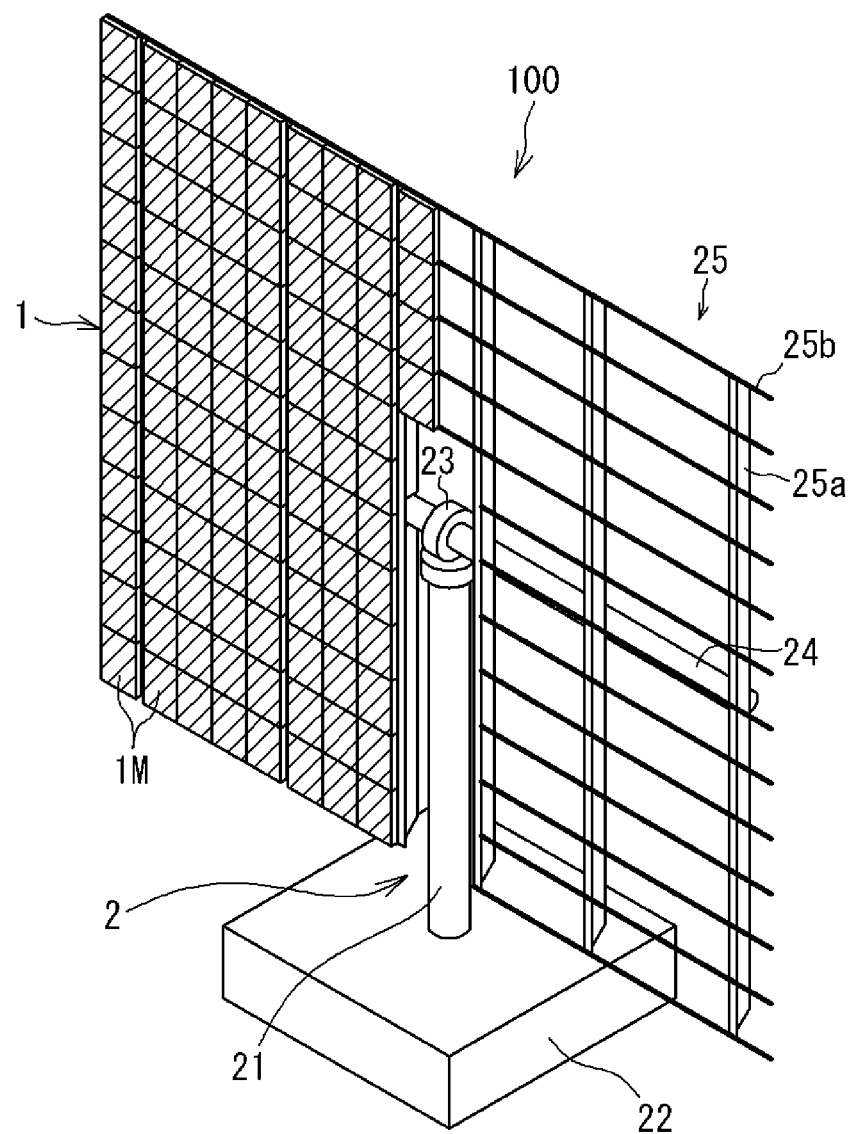
FIG. 2 is a perspective view of an example of one concentrator photovoltaic apparatus, viewed from the light receiving surface side, and shows the concentrator photovoltaic apparatus in a state of being assembled.

FIG. 1 and FIG. 2 are each a perspective view of an example of one concentrator photovoltaic apparatus viewed from the light receiving surface side. FIG. 1 shows a concentrator photovoltaic apparatus 100 in a completed state. FIG. 2 shows the concentrator photovoltaic apparatus 100 in a state of being assembled. The right half of FIG. 2 shows a state where the framework of a tracking mount 25 is seen, and the left half of FIG. 2 shows a state where modules 1M are mounted. In actuality, when the modules 1M are to be mounted to the tracking mount 25, mounting is performed in a state where the tracking mount 25 is laid on the ground.

In FIG. 1, the concentrator photovoltaic apparatus 100 includes: an array (the entire photovoltaic panel) 1 having a shape that is continuous on the upper side and is divided into right and left portions on the lower side; and a support device 2 therefor. The array 1 is formed by arraying the modules 1M on the tracking mount 25 (FIG. 2), with the tracking mount 25 on the rear side. In the example shown in FIG. 1, the array 1 is formed as an assembly composed of 200 modules 1M in total, i.e., (96(=12×8)×2) modules forming the right and left wings and 8 modules 1M forming the connection portion at the center. A pyrheliometer 26 for detecting the amount of direct solar radiation from the sun to the array 1 is mounted to, for example, an upper portion of the array 1.

The support device 2 includes a post 21, a base 22, a biaxial drive part 23, and a horizontal shaft 24 (FIG. 2) serving as a drive shaft. The lower end of the post 21 is fixed to the base 22, and the upper end of the post 21 is provided with the biaxial drive part 23.

In FIG. 1, the base 22 is firmly embedded in the ground to an extent that only the upper face of the base 22 is seen. In the state where the base 22 is embedded in the ground, the post 21 extends vertically, and the horizontal shaft 24 (FIG. 2) extends horizontally. The biaxial drive part 23 can rotate the horizontal shaft 24 in two directions of azimuth (angle around the post 21 as the central axis) and elevation (the angle around the horizontal shaft 24 as the central axis). In FIG. 2, a reinforcement member 25a that reinforces the tracking mount 25 is mounted to the horizontal shaft 24. In addition, a plurality of rails 25b extending in the horizontal direction are mounted to the reinforcement member 25a. Therefore, if the horizontal shaft 24 is rotated in the direction of azimuth or elevation, the array 1 is also rotated in that direction.

FIG. 1 and FIG. 2 show the support device 2 that supports the array 1 by means of a single post 21. However, the configuration of the support device 2 is not limited thereto. That is, any support device that can support the array 1 so as to be movable in two axes (azimuth, elevation) can be employed.

Usually, the array 1 extends vertically as in FIG. 1 at dawn and before sunset.

During the daytime, the biaxial drive part 23 operates such that the light receiving surface of the array 1 takes an attitude of always facing the sun directly from the front, and the array 1 performs a tracking operation of the sun.

Figure 3:
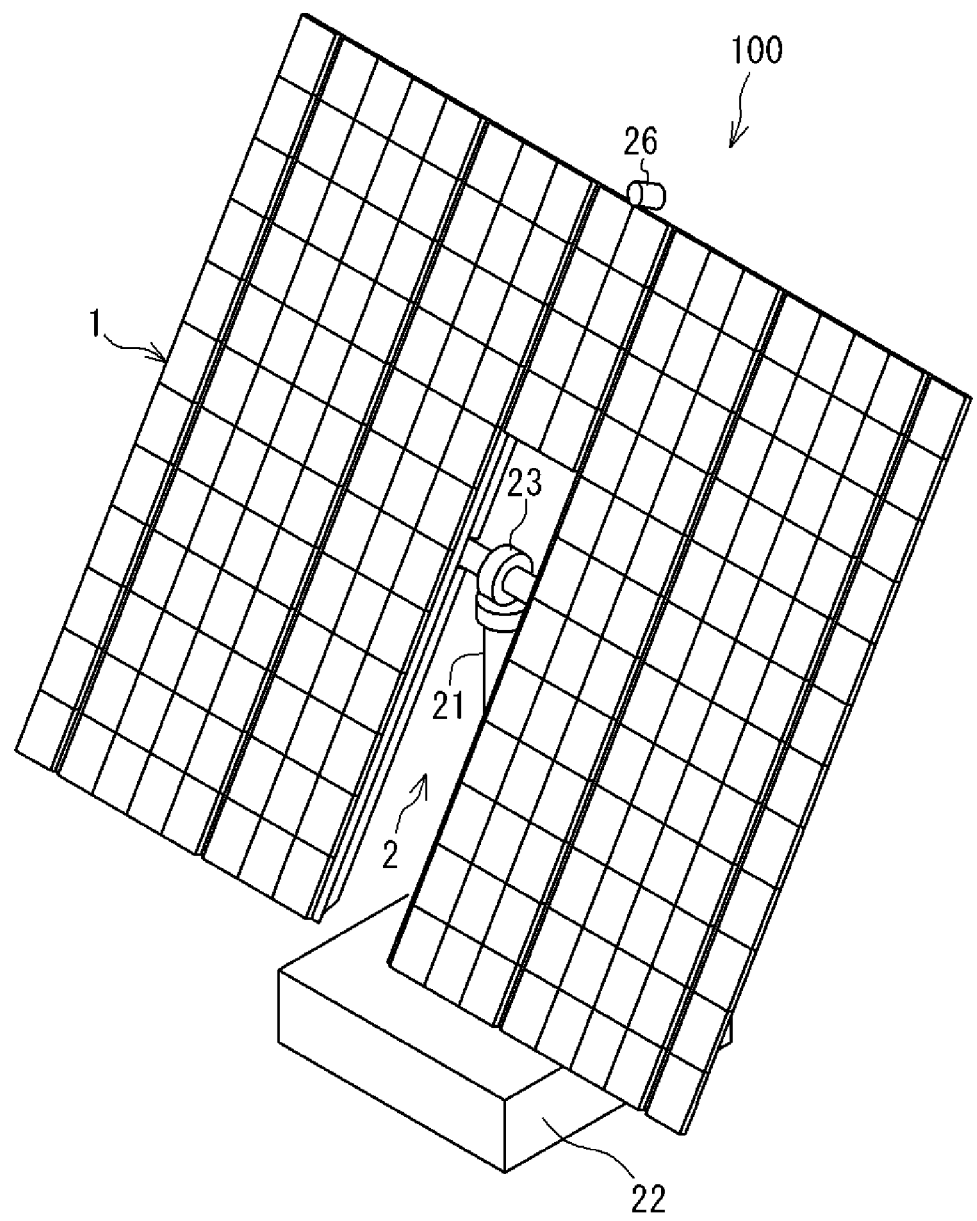
FIG. 3 is a perspective view showing, as an example, an attitude of an array facing the sun directly from the front.

FIG. 3 is a perspective view showing, as an example, an attitude of the array 1 facing the sun directly from the front. For example, at the culmination time at a place near the equator, the array 1 takes a horizontal attitude, with the light receiving surface directed toward the sun. During the nighttime, for example, the array 1 takes a horizontal attitude, with the light receiving surface directed toward the ground.

<<Configuration Example of Module>>

Figure 4:
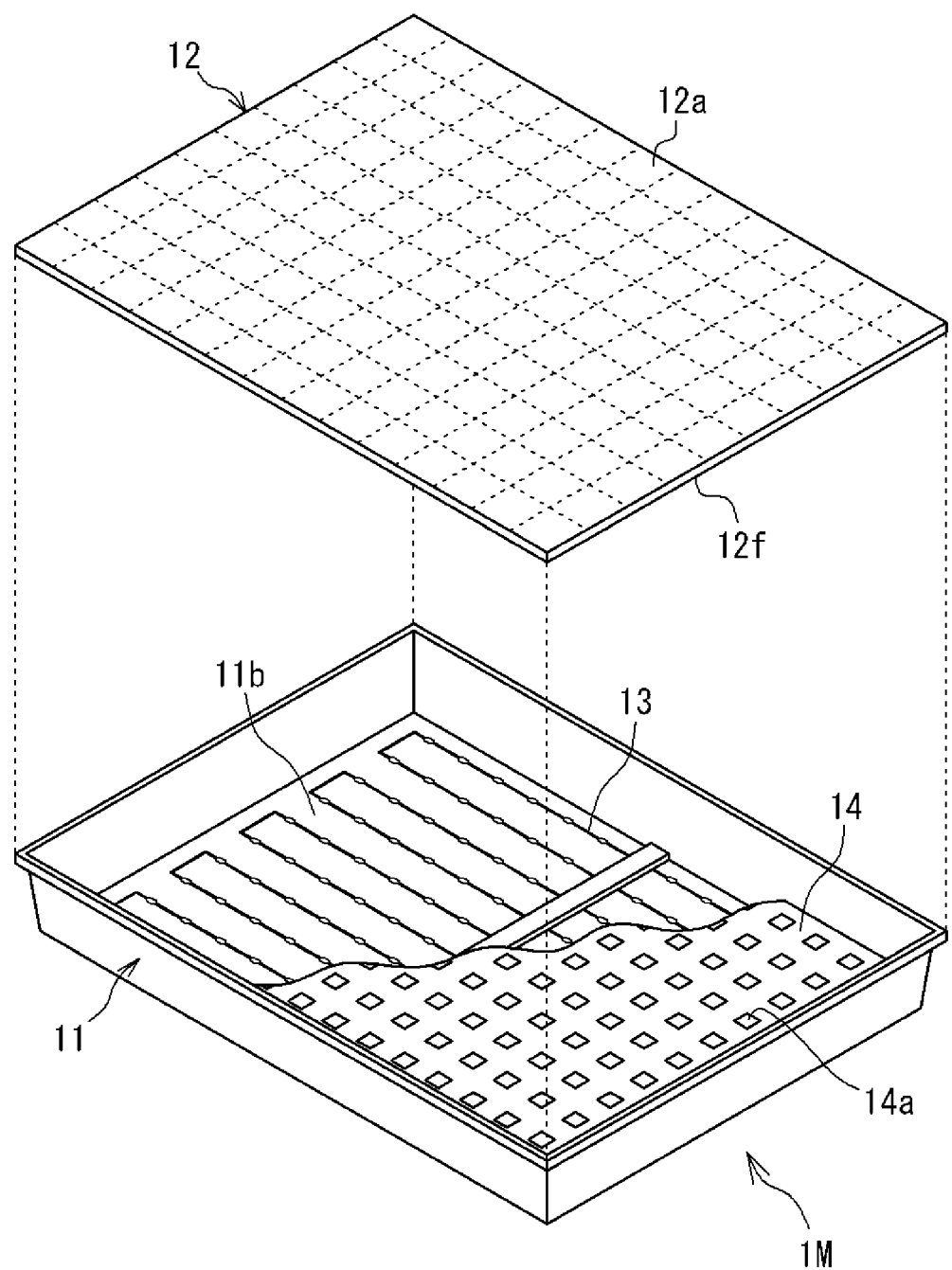
FIG. 4 is a perspective view showing an example of a configuration of a module.

FIG. 4 is a perspective view showing an example of a configuration of the module 1M. However, on the bottom face 11b side, only a flexible printed circuit 13 is shown, and other components are omitted.

In terms of the physical form in appearance, the module 1M includes: a housing 11 made of, for example, metal or resin and having a rectangular flat-bottomed container shape; and a concentrating portion 12 mounted, like a cover, to the housing 11. The concentrating portion 12 is formed by attaching resin condenser lenses (Fresnel lenses) 12f to the back face of a single optically transparent glass plate 12a, for example. For example, each of the indicated square sections (in this example, 14 squares×10 squares, but the number is merely an example for description) is a condenser lens 12f, and can cause sunlight to be converged at the focal point.

On the bottom face 11b of the housing 11, the slender flexible printed circuit 13 is disposed so as to be arrayed by being turned at the dead ends. The flexible printed circuit 13 has a relatively wide portion and a relatively narrow portion. Each cell (not shown) is mounted on the wide portion.

A shielding plate 14 made of metal, for example, is mounted between the flexible printed circuit 13 and the concentrating portion 12. In the shielding plate 14, at positions corresponding to the centers of the individual condenser lenses 12f, square openings 14a each having a shape similar to the square of the condenser lens 12f are formed. When the array 1 accurately tracks the sun and the angle of incidence of sunlight with respect to the module 1M is 0 degrees, light concentrated by the condenser lens 12f can pass through the opening 14a. When the tracking is deviated, concentrated light is blocked by the shielding plate 14.

<<Configuration Example of Unit>>

Figure 5:
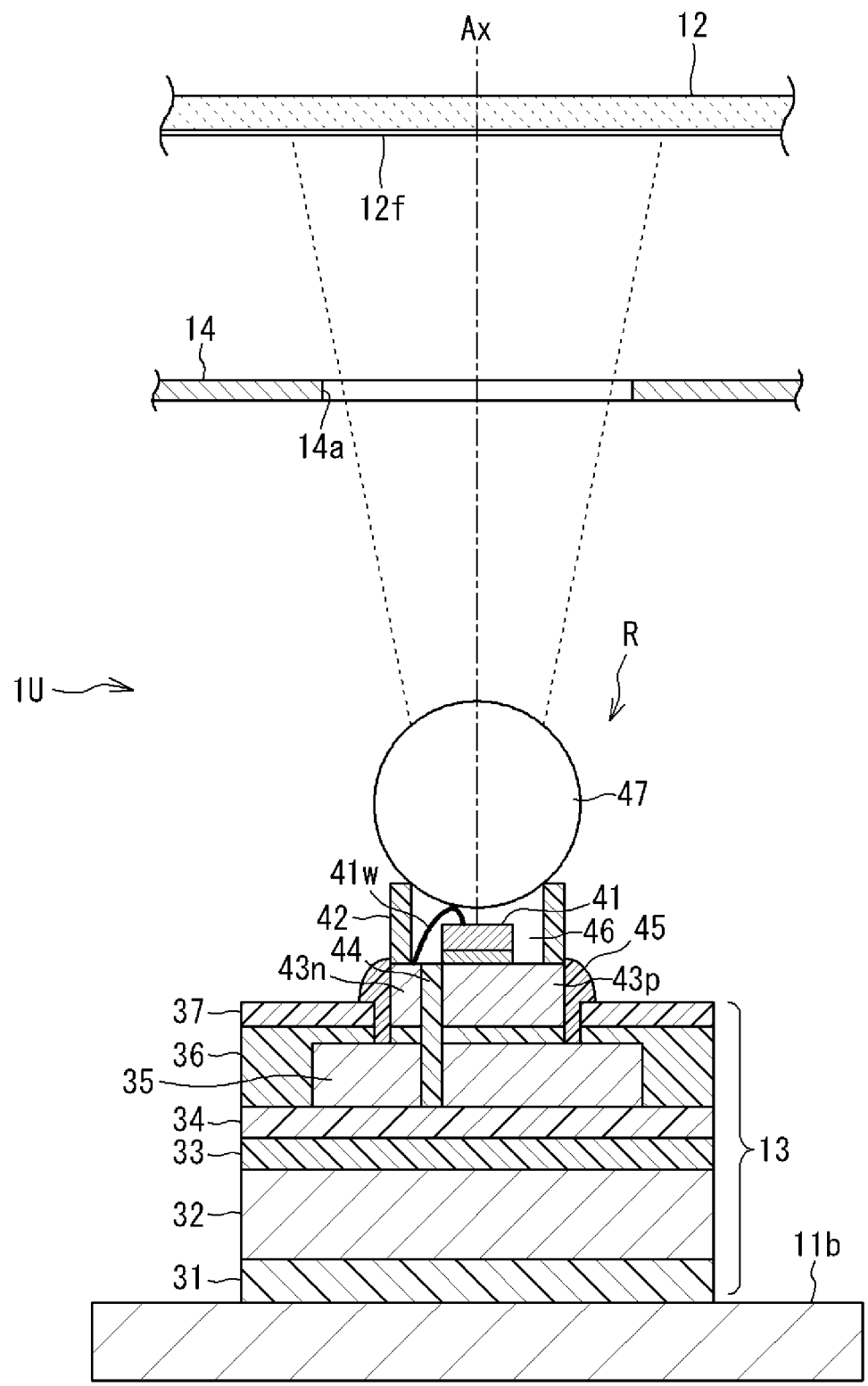
FIG. 5 is a cross-sectional view showing an example of a unit as a basic configuration of an optical system, for concentrate-type power generation, forming a module.

FIG. 5 is a cross-sectional view showing an example of a unit 1U as a basic configuration of an optical system, for concentrate-type power generation, forming the module 1M.

In the drawing, when the unit 1U faces the sun directly from the front and the angle of incidence of sunlight is 0 degrees, a secondary lens 47 and a cell 41 of a light receiving portion R are present on an optical axis Ax of a condenser lens 12f which is a primary lens. Light concentrated by the condenser lens 12f is taken in by the secondary lens 47 of the light receiving portion R, and is guided to the cell 41.

The light receiving portion R in FIG. 5 is expressed in an enlarged manner as appropriate for convenience for describing the structure, and is not proportional to the actual dimensions.

When viewed as a cross sectional structure, the flexible printed circuit 13 includes a heat dissipating adhesive 31, a back face copper layer 32, an adhesive layer 33, an insulating base material 34, a copper pattern 35, an adhesive layer 36, and a cover lay 37, on the bottom face 11b of the housing 11.

From the output electrode to the copper pattern 35 of the cell 41, the P-electrode side and the N-electrode side are separated from each other and are insulated from each other by an insulating resin 44. A lead frame 43p connected to the P side of the output of the cell 41 and a lead frame 43n connected to the N side via a gold wire 41w are each separately connected to the copper pattern 35. A resin ring 42 on the lead frames 43p, 43n supports the secondary lens 47. The peripheries of the lead frames 43p, 43n are covered by a potting resin 45. A transparent sealing resin 46 is filled in the space between the secondary lens 47 and the cell 41. The sealing resin 46 seals the cell 41 and adheres to the secondary lens 47. The sealing resin 46 is, for example, a transparent silicone resin. For example, this sealing resin 46 could discolor due to a long-time use.

Figure 6:
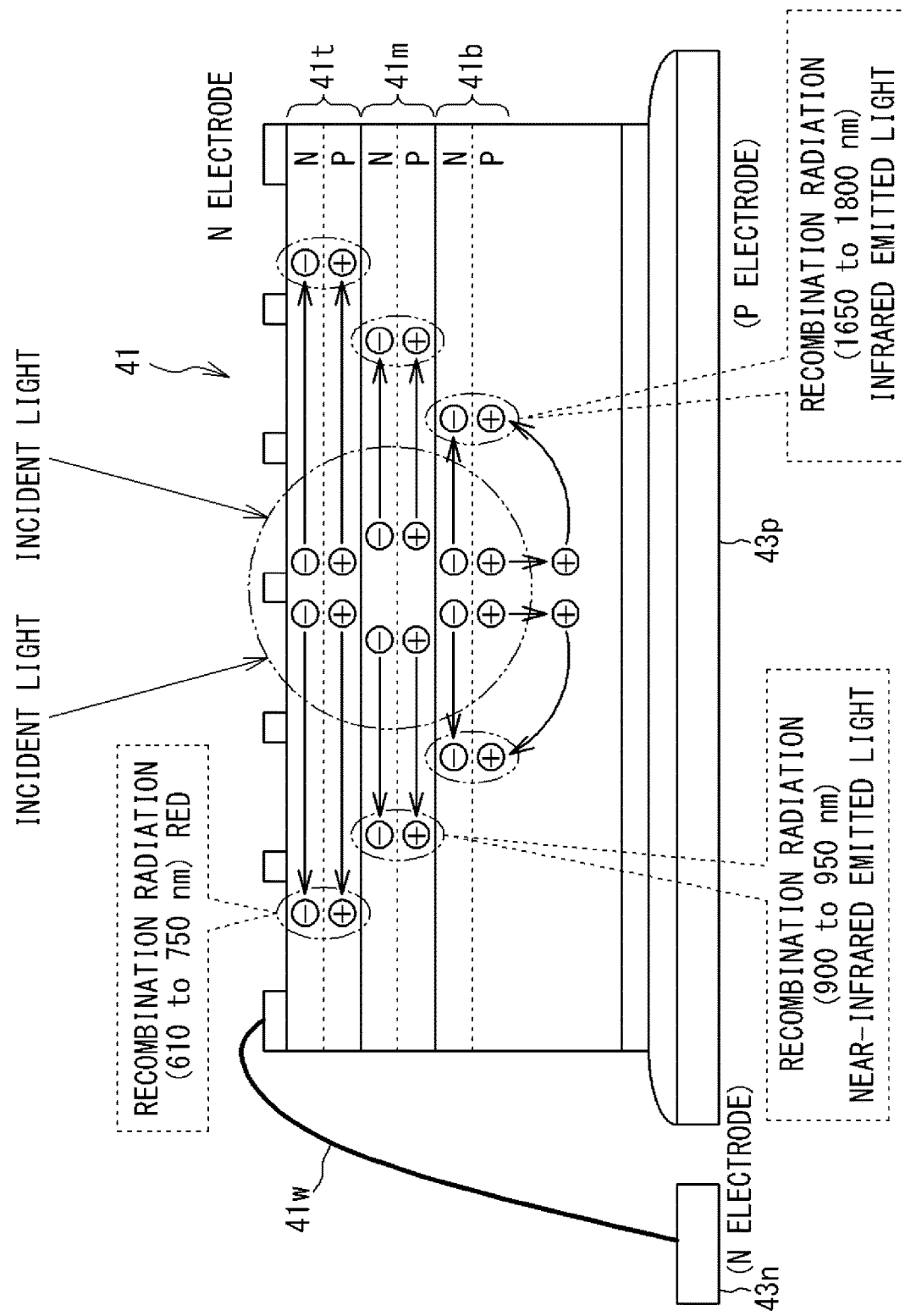
FIG. 6 shows an example of the internal structure (cross section) of a cell.

FIG. 6 shows an example of the internal structure (cross section) of the cell 41. In FIG. 6, the cell 41 includes a top cell 41t, a middle cell 41m, and a bottom cell 41b, from the top in this order. In a state where incident light is being received from the sun, when the output is not extracted from the lead frames 43p, 43n, recombination radiation between electrons and hole carriers occurs in the top cell 41t. The emitted light at this time is red visible light having a wavelength of 610 to 750 nm. Recombination radiation between electrons and hole carriers also occurs in the middle cell 41m. The emitted light at this time is near-infrared light having a wavelength of 900 to 950 nm. Further, recombination radiation between electrons and hole carriers also occurs in the bottom cell 41b. The emitted light at this time is infrared light having a wavelength of 1650 to 1800 nm.

<<Example of Circuit Connection Diagram of Module>>

Figure 7:
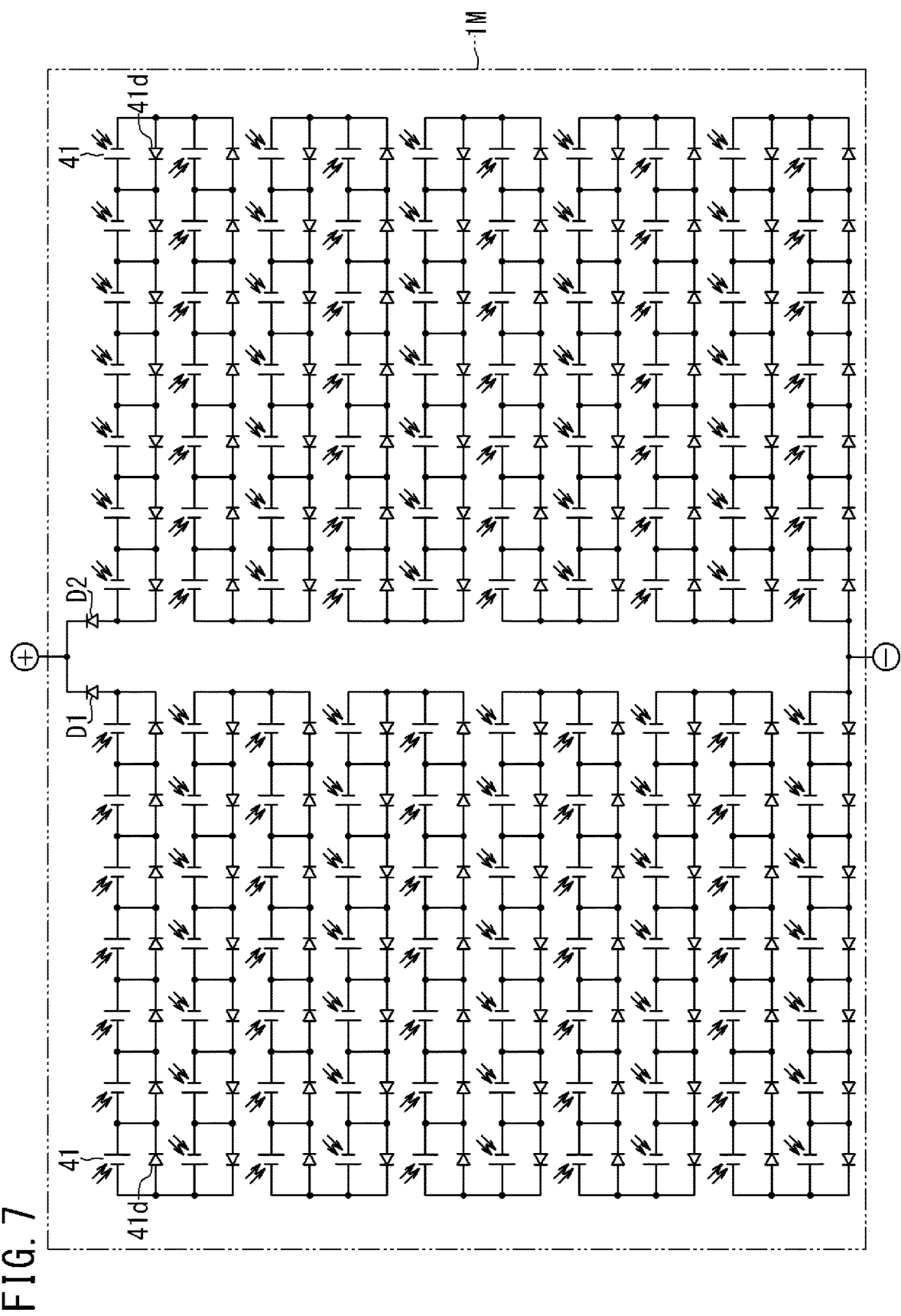
FIG. 7 is an example of a connection diagram of a circuit in a single module.

FIG. 7 is an example of a connection diagram of a circuit in a single module 1M. A bypass diode 41d is connected to each cell 41 in parallel. With respect to the large number of cells 41, in FIG. 7, for example, the cells on the left side are connected in series and the cells on the right side are connected in series. In addition, the cells on the left side and the cells on the right side are connected in parallel with each other. Even when there is a cell 41 that has been broken down and does not generate power anymore, since the bypass diode 41d is provided, the series circuit is not interrupted at that portion. That is, the number of cells 41 that have been broken down is small relative to the entire number, the influence is not big as a whole. Conversely, when a large number of cells 41 that cannot be ignored relative to the entire number have been broken down, influence on power generation of the entire module 1M is increased. Since the reverse withstand voltage of the cell 41 is low, backflow prevention diodes D1, D2 are provided in order to prevent a voltage from being applied from outside. Therefore, it is not possible to apply a voltage from outside of the module 1M to cause a current to flow in the cells 41 in the module 1M.

<<Taking Image of Array>>

Figure 8:
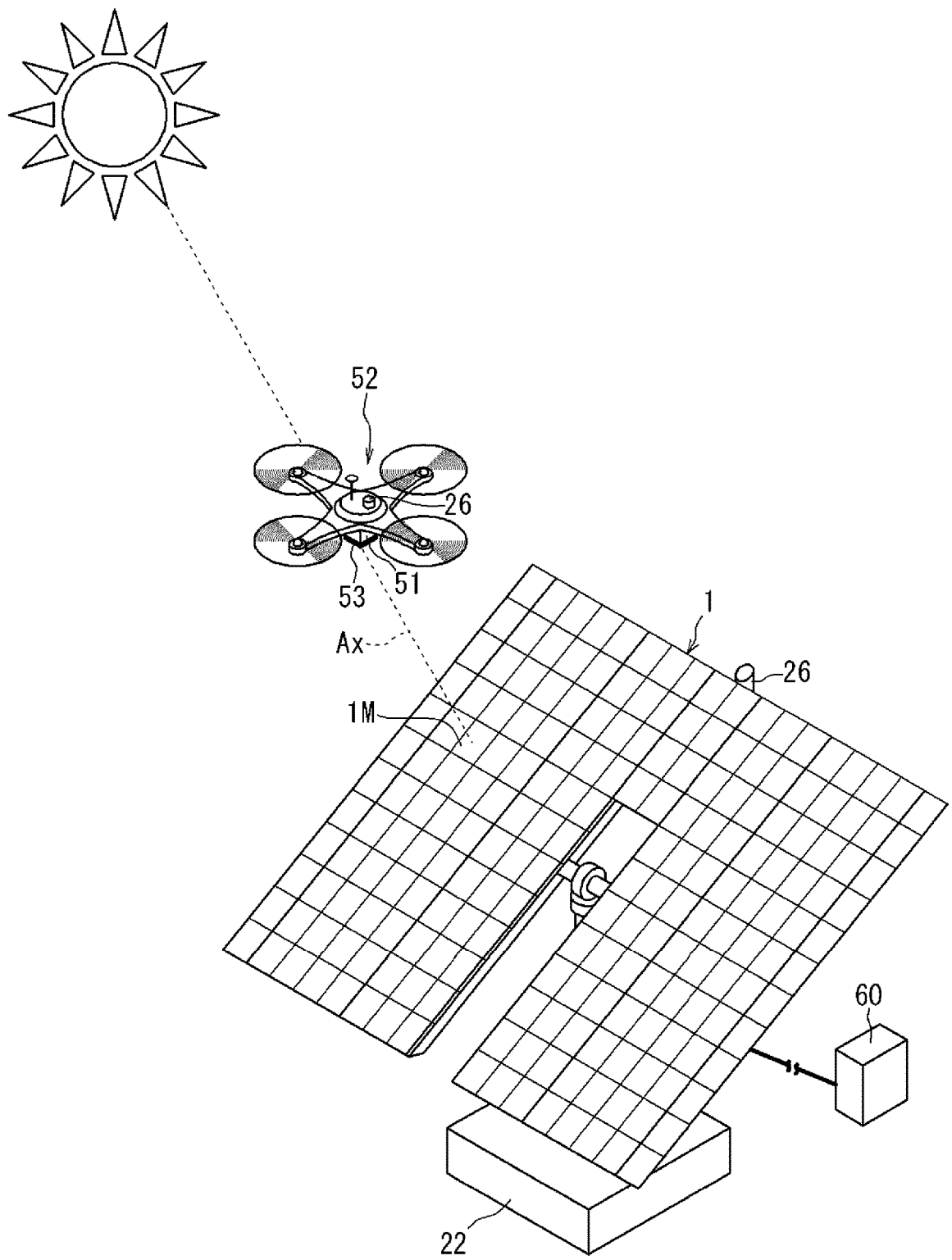
FIG. 8 is a perspective view showing an example of a state where an image of an array is taken.

FIG. 8 is a perspective view showing an example of a state where an image of the array 1 is taken. As shown in FIG. 8, an image of the array 1 is taken from the front by using an imaging apparatus 51 (camera) mounted to an aerial vehicle (for example, so-called drone) 52. The imaging apparatus 51 is on the optical axis Ax of the module 1M facing the sun directly from the front, and takes an image while the imaging apparatus 51 is directed so as to be perpendicular to the array 1. That is, the imaging apparatus 51 is positioned between the sun and the array 1 in a state of facing the sun directly from the front and having 0 degrees of the angle of incidence of sunlight. While moving up, down, right, and left, the imaging apparatus 51 takes images of the entirety of the array 1. When taking images, the distance between the array 1 and the imaging apparatus 51 need not necessarily be constant. It is sufficient that the imaging apparatus 51 simply takes images so as to scan the entirety of the array. The appropriate distance between the imaging apparatus 51 and the module 1M opposed thereto is dependent on the resolution of the imaging apparatus 51.

Meanwhile, the pyrheliometer 26 detects the amount of direct solar radiation onto the array 1. By measuring the intensity of the spectrum of emitted light described later and the amount of direct solar radiation, it is possible to quantitatively evaluate whether the light receiving portion R is in a good state or a bad state. The pyrheliometer 26 may be provided to the aerial vehicle 52. Alternatively, the pyrheliometer 26 may be provided to both of the aerial vehicle 52 and the array 1.

<<Light Emission of Cell>>

The generated power of the array 1 is sent to an inverter apparatus (power conditioner) 60, and is converted into an alternating-current power. Usually, the inverter apparatus 60 performs an MPPT (Maximum power point tracking) control, and always controls the voltage and the current such that the maximum power can be extracted under the solar radiation condition at the time point.

Here, operation of the inverter apparatus 60 is stopped, or the maximum power point is intentionally avoided, whereby a state where the maximum power is not extracted is produced. In such a state, due to the generated power which is no longer taken out, the cell 41 emits light through a photoluminescence or electroluminescence phenomenon. Although the emitted light is weak when compared with reflected light or scattered light of sunlight, if, for example, an optical filter 53 is mounted to the imaging apparatus 51, an image of the emitted light of the cell 41 can be easily taken. At this time, for example, when the sealing resin 46 around the cell 41 is transparent, the emitted light can be captured by the imaging apparatus 51. Conversely, when the transparency of the sealing resin 46 has been reduced, the emitted light is difficult to be captured by the imaging apparatus 51. That is, the transparency of the sealing resin 46 appears in terms of brightness or darkness of red light that can be captured by the imaging apparatus 51.

Figure 9:
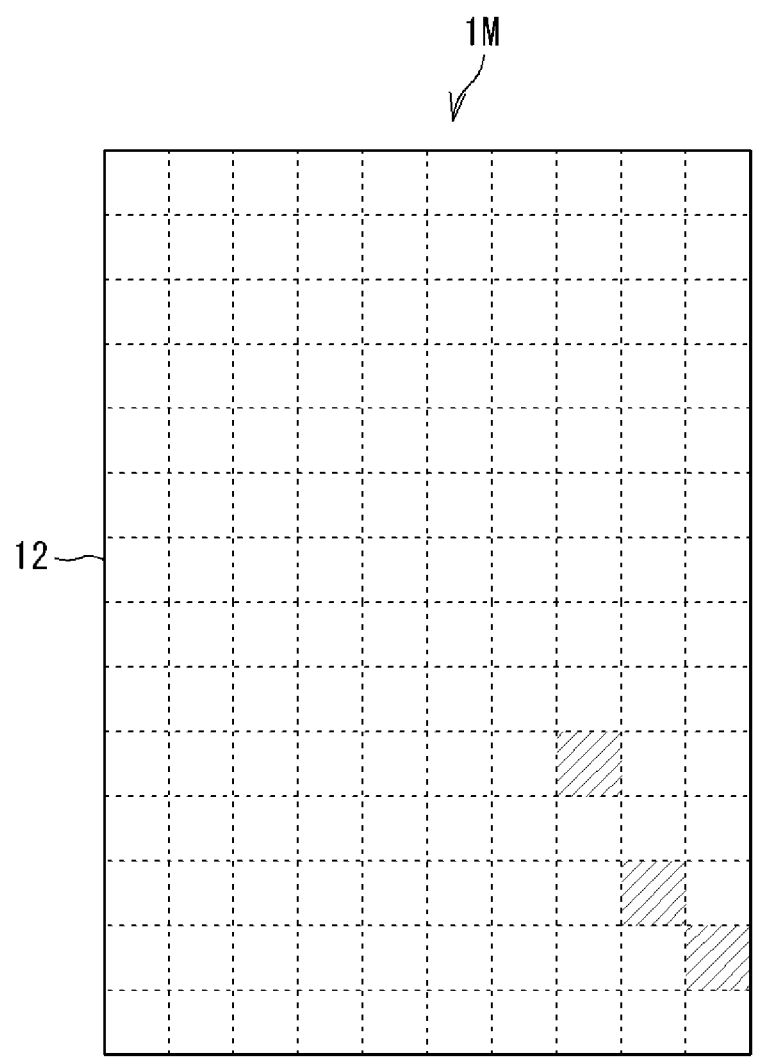
FIG. 9 shows an example of a result of imaging when all of the cells in a module are caused to emit light.

FIG. 9 shows an example of a result of the imaging when all of the cells 41 in a module 1M are caused to emit light. A place where the image of the emitted light is taken at a certain level or higher of brightness through the concentrating portion 12 is shown in white, and a place where the brightness is less than the certain level is shown with oblique lines. Then, for example, as shown in FIG. 9, at three places, emitted light cannot be confirmed or it is darker than the surrounding portions. That is, at these three places, there is a possibility that the sealing resin 46 has discolored and the transparency thereof has been reduced. When the number of such defective places is a small number that would not cause a large influence, relative to the entire number (10×14 in the example shown), the state may be observed for the time being. Conversely, when the number of the defective places is a large number that cannot be ignored relative to the entire number, a significant decrease in generated power is predicted, and thus, it is preferable to replace the entire module 1M.

Figure 10:
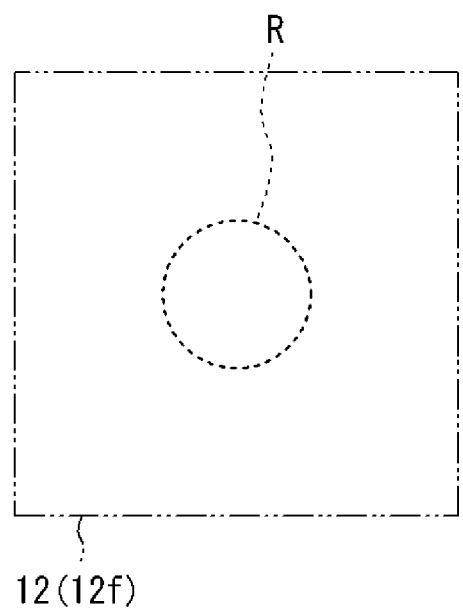
FIG. 10 shows one section (normal) of a concentrating portion (condenser lens) observed when an image of a module is taken.
Figure 11:
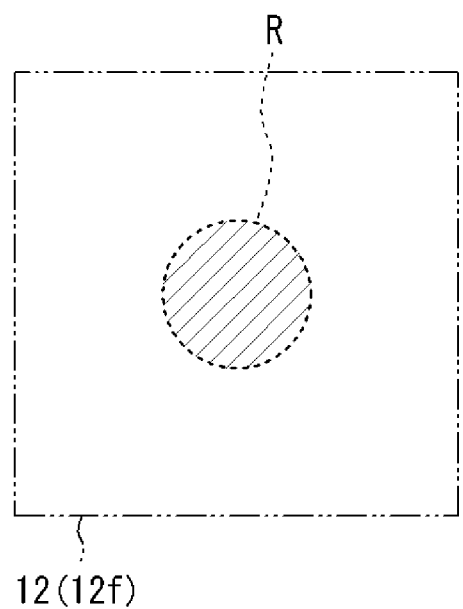
FIG. 11 shows one section (defective) of a concentrating portion (condenser lens) observed when an image of a module is taken.

FIG. 10 and FIG. 11 each show one section of the concentrating portion 12 (the condenser lens 12f) observed when an image of the module 1M is taken. The round portion at the center is the portion surrounding the cell 41 viewed through the secondary lens 47 of the light receiving portion R. FIG. 10 shows a place where the image of the emitted light is taken at a certain level or higher of brightness. FIG. 11 shows a place where emitted light cannot be confirmed or it is darker than the surrounding portion.

Figure 12:
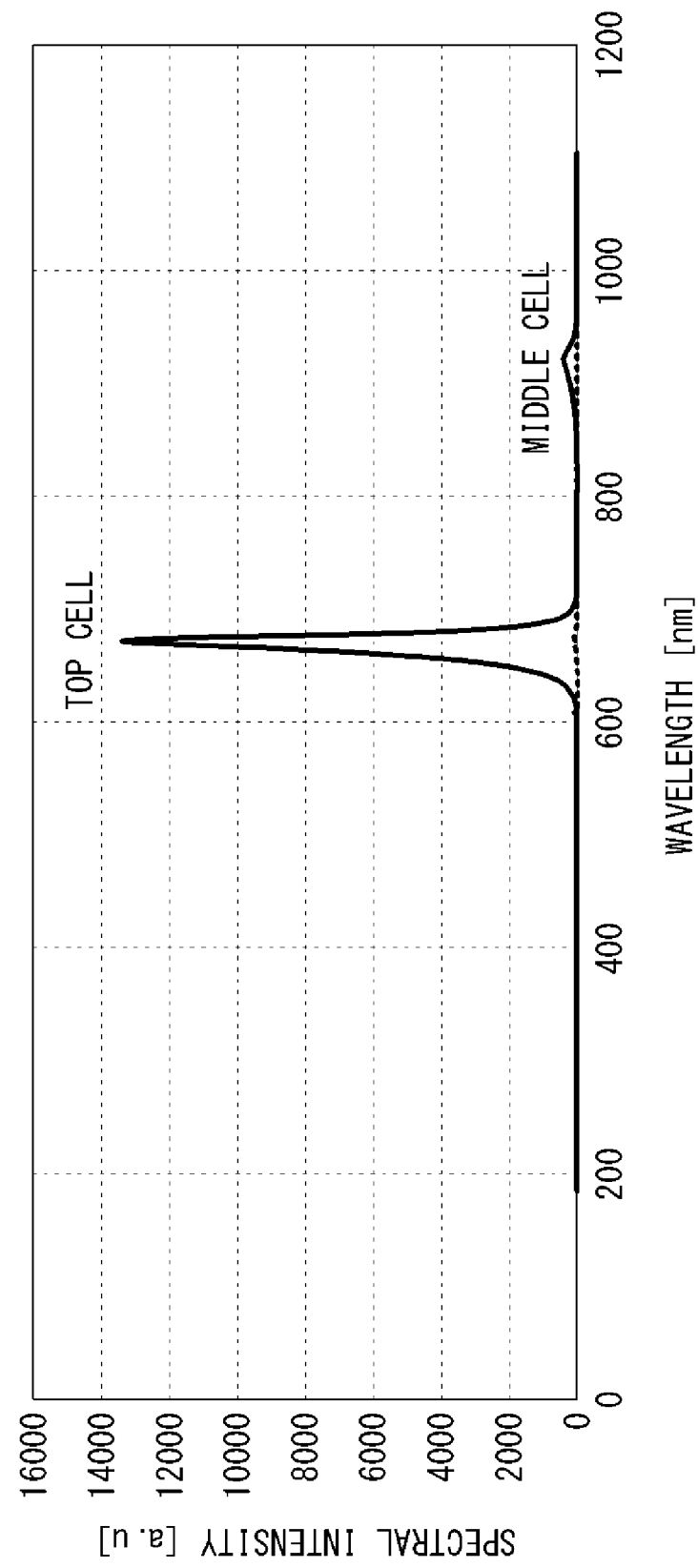
FIG. 12 is spectrum data of light captured by an imaging apparatus.

FIG. 12 shows spectrum data (spectral intensity of emitted light) of the light captured by the imaging apparatus 51. In FIG. 12, the solid line indicates a spectrum based on emitted light of the cell 41 in a normal light receiving portion R. As shown, from the top cell, light having a wavelength 610 to 750 nm is clearly observed. From the middle cell as well, weak light is observed near 900 to 950 nm. The dotted line indicates a spectrum based on emitted light of the cell 41 in a light receiving portion R of which deterioration has been advanced. As shown, light from the top cell has hardly arrived. Light from the middle cell has not arrived, either.

<<Summary and Supplementary Description>>

According to the inspection system for the concentrator photovoltaic apparatus 100, while the array 1 is tracking the sun and causing sunlight to be concentrated on the cell 41, the inverter apparatus 60 produces a state where extraction of a power from the array 1 is restricted, to cause the cell 41 to spontaneously emit light, and the imaging apparatus 51 takes an image of the emitted light of the cell 41.

In terms of an inspection method for the light receiving portion R, the array 1 is caused to track the sun and sunlight is caused to be concentrated on the cell 41; a state where the imaging apparatus 51 is positioned between the sun and the array 1 tracking the sun such that the imaging apparatus 51 is able to take an image of the array 1 from a direction orthogonal to the surface of the array 1, is produced; and a state where extraction of a power from the array 1 is restricted is produced, to cause the cell 41 to spontaneously emit light, and an image of the emitted light is taken by the imaging apparatus 51.

The inspection system for the concentrator photovoltaic apparatus 100 and the inspection method for the light receiving portion R are an inspection system/inspection method realized by focusing on the fact that the cell 41 can be caused to spontaneously emit light, and the fact that the emitted light can be observed from outside through the condenser lens 12f. When the cell 41 is caused to spontaneously emit light, if there is any change in the light receiving portion R, an optical result based on the emitted light of the cell 41 is influenced. For example, at a place where the resin (the sealing resin 46) around the cell is not deteriorated, the spectral intensity of the emitted light observed through the condenser lens is relatively high. In contrast to this, at a place where the resin around the cell is more deteriorated, the spectral intensity of the emitted light is reduced accordingly. Therefore, deterioration of the resin can be detected on the basis of the spectral intensity. Thus, inspection of whether or not there is any change in the light receiving portion R can be facilitated.

Although this inspection need not be performed every day, if images of the array 1 are periodically taken by the imaging apparatus 51, and change in the luminance distribution from the initial state, peak shift of the wavelength, and the like are observed, non-destructive inspection of the light receiving portion R can be performed. Thus, a concentrator photovoltaic apparatus inspection system that allows operation of the concentrator photovoltaic apparatus 100 to be performed while advancement of deterioration is monitored, can be provided.

In addition, whether the cell is in a good state or a bad state can also be determined by comparing and spectroscopically evaluating results of imaging of emitted light of the cell 41, in the same season (for example, on the same day), between when the direct light is not less than 600 W/m$^2$ and when the direct light is not greater than 100 W/m$^2$ such as in the morning or the evening.

The state where extraction of a power from the array 1 is restricted is, for example, a state where no power is extracted from the cell 41 during power generation.

In this case, the remaining current (electrons and hole carriers) that is not extracted to the outside undergoes recombination at the PN junction portion inside the cell 41, and emits light. Since the cell 41 causes a light emission phenomenon in this manner, the imaging apparatus 51 can take an image of this.

The state where extraction of a power from the array 1 is restricted is, for example, a state where the MPPT control on the array 1 is not optimized. When the amount of solar radiation in the morning and evening is small (for example, the direct solar radiation light being not greater than 100 W/m$^2$), there is a time period where the MPPT control in the inverter apparatus 60 is not optimized. In that case, not all current is supplied to the system through the inverter apparatus 60. Also in this case, the remaining current (electrons and hole carriers) that is not extracted to the outside could undergo recombination at the PN junction portion inside the cell 41 and emit light.

Taking an image of emitted light is extracting the spectrum of the emitted light. In the above embodiment, the top cell that emits red light (visible light) has been described. However, states (crystal internal stress, presence or absence of defect) of the middle cell and the bottom cell inside the cell 41 can also be inspected through spectrum analysis. The wavelength region (about 900 to 950 nm) of the near-infrared emitted light of the middle cell corresponds to wavelengths longer than those of the top cell, and thus, the top cell becomes transparent at that wavelength region, and can be observed from outside. Therefore, as in the case of the top cell, when a band-pass optical filter for the middle cell is provided in front of the imaging apparatus 51, the state in the middle cell can also be inspected. The same applies to the bottom cell.

As for a cell that does not emit light, it is conceivable that, for example, the PN junction therein is broken and hole carriers are not generated in response to the incident light. It is also conceivable that hole carriers are generated but recombination radiation does not occur. That is, it is conceivable that due to the presence of a defect or the like, electrons and hole carriers do not flow inside the crystal, or cannot recombine with each other. In any case, it is possible to easily detect that the power generating function as a cell has been lost.

Thus, in the case of the emitted light from, for example, the top cell of the cell, a spectrum of visible light is extracted, and if there is any change, the change can be detected. In the case of the middle cell or the bottom cell, a spectrum of near-infrared emission light or infrared emission light is released. Therefore, on the basis of these, if there is any change, an internal defect can be detected in a non-destructive manner.

Meanwhile, if light emission of a cell is observed although the observation is performed while the MPPT control by the inverter apparatus 60 is being performed in an optimum manner (for example, the direct light being not less than 600 W/m$^2$), it is possible to determine that there is an abnormality in a circuit near the cell (for example, breakage of the gold wire, breakage in wiring, etc.).

For evaluation of a good state or a bad state of the light receiving portion R on the basis of the light emission phenomenon of a cell, an estimation value of the spectral intensity of emitted light that should be internally consumed at the luminous efficiency of the cell can be calculated on the basis of: the amount of direct solar radiation detected by the pyrheliometer 26; the voltage and the current of the module 1M or the array 1; and the optical efficiency of the condenser lens 12$f$, for example. Then, the estimation value is compared with the spectral intensity of the emitted light obtained from an actual imaging result, whereby whether the light receiving portion R is in a good state or a bad state can be quantitatively determined. The voltage and the current of the array 1 can be detected by the inverter apparatus 60. The voltage and the current of each module 1M are individually detected by using a measuring instrument, for example.

In FIG. 12, for example, on the basis of how much the peak in the spectrum of the initial emitted light has shifted, the temperature at the junction in the cell can be analyzed, and deterioration of heat dissipating performance can also be analyzed.

Further, on the basis of the fact that the peak wavelength of the light emission spectrum changes due to the temperature of the cell, various kinds of information can be obtained from the emitted light of the cell. For example, in FIG. 5, the flexible printed circuit 13 of the light receiving portion R could be detached, at the heat dissipating adhesive 31, from the bottom face 11$b$. When the detachment has occurred, heat dissipating performance decreases, and the temperature of the cell 41 increases. When the temperature of the cell 41 increases, the peak wavelength of the light emission spectrum moves toward a higher wavelength. Therefore, whether or not there is an abnormality related to heat dissipation of the cell 41 can be recognized on the basis of the observed peak wavelength. The temperature of the cell 41 is also influenced by the ambient temperature (air temperature) of the array 1 and the temperature of the bottom face 11$b$ of the housing 11. Therefore, in order to accurately and clearly determine whether the light receiving portion R is in a normal state or an abnormal state, these pieces of information also need to be taken into consideration. That is, inspection of the light receiving portion R can be performed on the basis of the peak wavelength of the light emission spectrum of the cell 41, while at least one of the ambient temperature of the array 1 and the temperature of the bottom face of the housing 11 is taken into consideration.

<<Others>>

As for the aerial vehicle 52 in the above embodiment, the description has been given assuming that the aerial vehicle 52 is of a small type (drone) that can be remotely manipulated or automatically controlled. However, basically, the imaging can also be performed by a large and manned aerial vehicle. The imaging may be performed from a high place, using another means (for example, using a crane truck, etc.).

In the above embodiment, a photovoltaic apparatus that uses the condenser lens has been described. However, also with respect to a photovoltaic apparatus in which sunlight is reflected by a concave mirror and concentrated light is guided to a cell, inspection of the light receiving portion can be performed in a similar manner.

<<Supplementary Note>>

The above embodiment is merely illustrative in all aspects and should not be recognized as being restrictive. The scope of the present disclosure is defined by the scope of the claims, and is intended to include meaning equivalent to the scope of the claims and all modifications within the scope.

REFERENCE SIGNS LIST 1 array
1M module
1U unit
2 support device
11 housing
11b bottom face
12 concentrating portion
12a glass plate
12f condenser lens
13 flexible printed circuit
14 shielding plate
14a opening
21 post
22 base
23 biaxial drive part
24 horizontal shaft
25 tracking mount
25a reinforcement member
25b rail
26 pyrheliometer
31 heat dissipating adhesive
32 back face copper layer
33 adhesive layer
34 insulating base material
35 copper pattern
36 adhesive layer
37 cover lay
41 cell
41d bypass diode
41t top cell
41m middle cell
41b bottom cell
41w gold wire
42 ring
43p, 43n lead frame
44 insulating resin
45 potting resin
46 sealing resin
47 secondary lens
51 imaging apparatus
52 aerial vehicle
53 optical filter
60 inverter apparatus
100 concentrator photovoltaic apparatus
D1, D2 backflow prevention diode
R light receiving portion

The invention claimed is:

1. An inspection system for a concentrator photovoltaic apparatus, the inspection system comprising:
a module formed by assembling, in a housing, units in each of which a light receiving portion including a cell for power generation is provided at a position where sunlight is concentrated by a concentrating portion;
a tracking mount configured to track the sun, the tracking mount having mounted thereto an array formed by assembling a plurality of the modules;
an inverter apparatus configured to extract a direct-current power generated by the array, convert the direct-current power into an alternating-current power, and output the alternating-current power; and
an imaging apparatus being positioned between the sun and the array tracking the sun, the imaging apparatus being configured to take an image of the array from a direction orthogonal to a surface of the array, wherein
while the array is tracking the sun and is causing sunlight to be concentrated on the cell,
the inverter apparatus produces a restricted state where extraction of a power from the array is restricted, to cause the cell to spontaneously emit light, and
the imaging apparatus takes an image of the emitted light of the cell.

2. The inspection system for the concentrator photovoltaic apparatus, according to claim 1, wherein
the restricted state is a state where no power is extracted from the array during power generation.

3. The inspection system for the concentrator photovoltaic apparatus according to claim 1, wherein
the restricted state is a state where a maximum power point tracking control for the array is not optimized.

4. The inspection system for the concentrator photovoltaic apparatus according to claim 1, wherein
taking an image of the emitted light of the cell is extracting a spectrum of the emitted light.

5. The inspection system for the concentrator photovoltaic apparatus according to ,claim 1, wherein
the imaging apparatus is mounted to an aerial vehicle.

6. The inspection system according to claim 5, wherein
a pyrheliometer configured to detect an amount of direct solar radiation that reaches the array is provided to at least one of the array and the aerial vehicle.

7. The inspection system according to claim 5, wherein
an optical filter that allows only a spectrum of the emitted light from the cell to pass through the optical filter is mounted to the imaging apparatus.

8. An inspection method for a light receiving portion performed on
a unit in which a light receiving portion including a cell for power generation is provided at a position where sunlight is concentrated by a concentrating portion,
a module being an assembly of the units, and
an array being an assembly of the modules, the inspection method comprising:
causing the array to track the sun and causing sunlight to be concentrated on the cell;
producing a state where an imaging apparatus is positioned between the sun and the array tracking the sun such that the imaging apparatus is able to take an image of the array from a direction orthogonal to a surface of the array; and
producing a state where extraction of a power from the array is restricted, to cause the cell to spontaneously emit light, and taking, by the imaging apparatus, an image of the emitted light.

9. The inspection method for the light receiving portion according to claim 8, wherein
inspection of the light receiving portion is performed on the basis of a spectral intensity of the emitted light of the cell relative to an amount of direct solar radiation that reaches the array.

10. The inspection method for the light receiving portion according to claim 8, wherein
inspection of the light receiving portion is performed on the basis of a spectral intensity of the emitted light of the cell relative to a current and a voltage detected with respect to the module or the array.

11. The inspection method for the light receiving portion according to claim 8, wherein
inspection of the light receiving portion is performed on the basis of a peak wavelength of a light emission spectrum of the cell, while at least one of an ambient temperature of the array and a temperature of a bottom face of a housing of the module is taken into consideration.

\* \* \* \* \*